Sept. 28, 1965
J. A. GREENLY ETAL
3,208,369
BREWING MECHANISM
Filed March 28, 1963
3 Sheets-Sheet 1
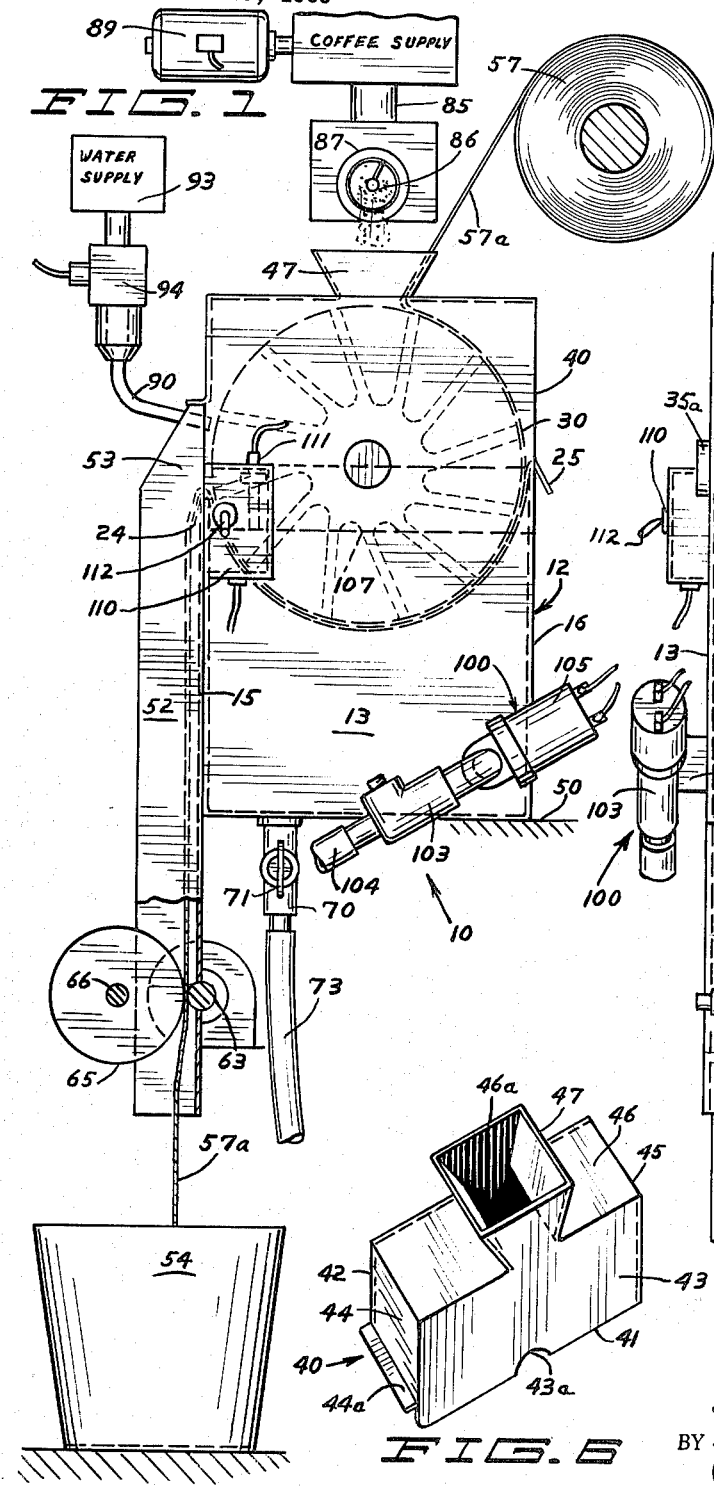
INVENTORS
JOHN A. GREENLY
BY ARNOLD I. RISTIMAKI
ATTORNEYS

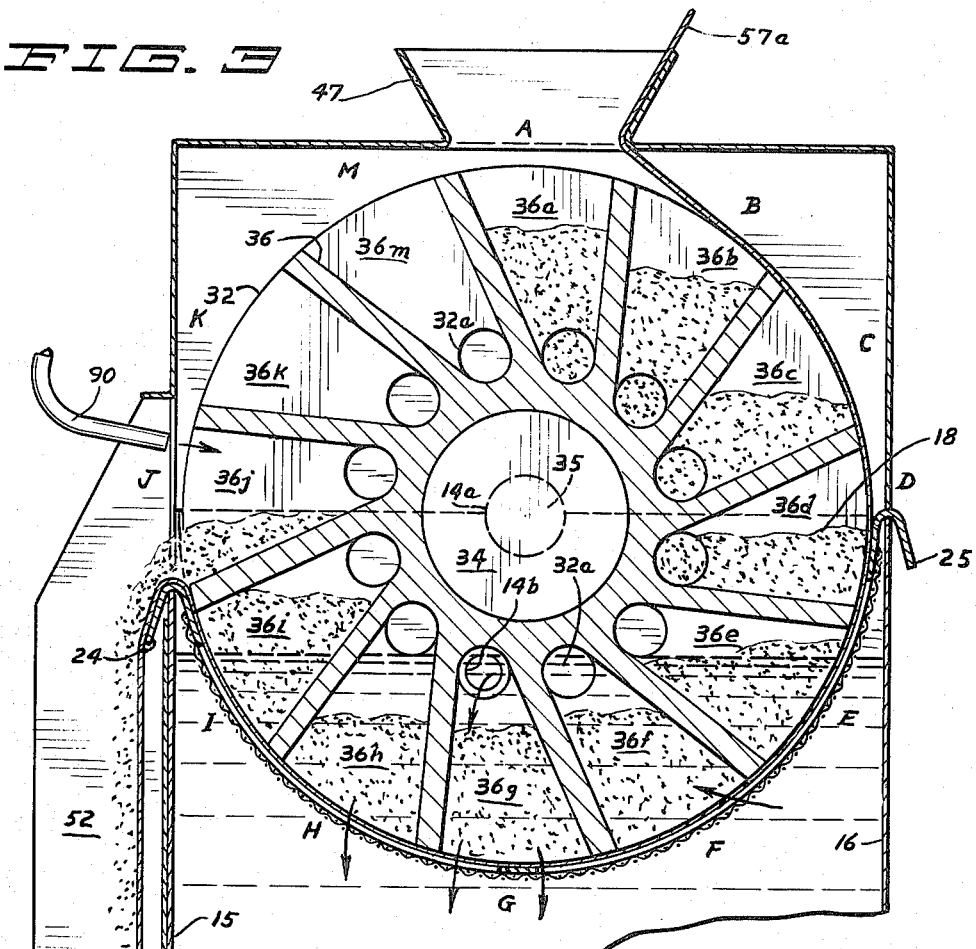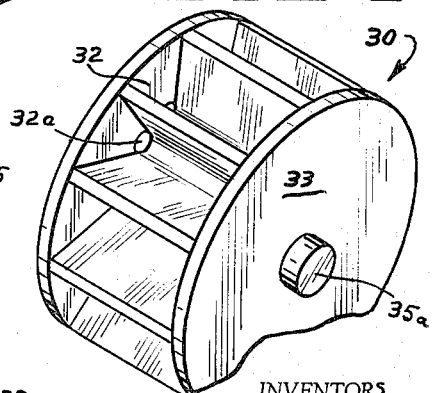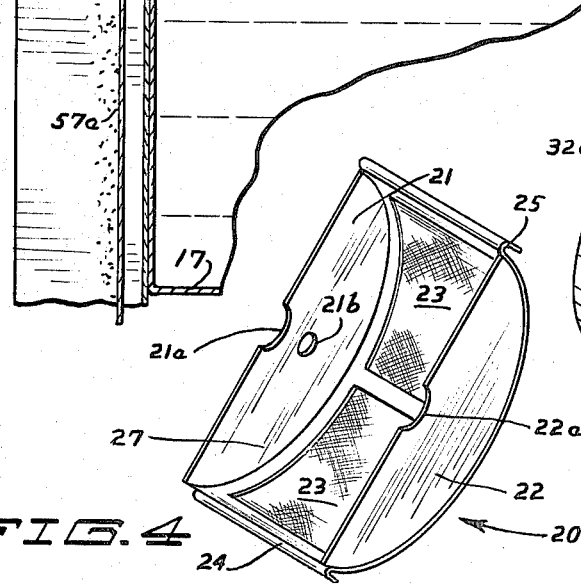

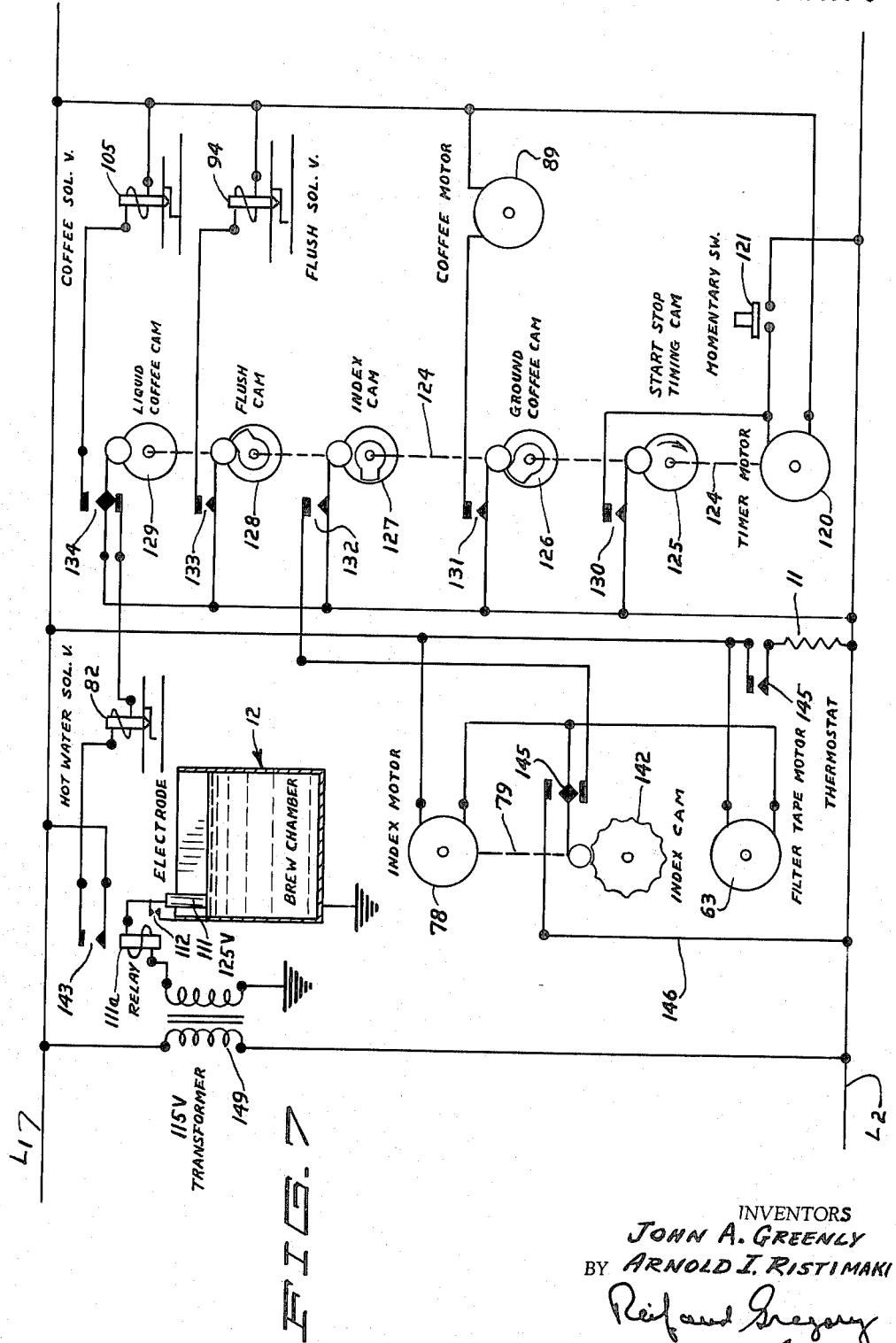

United States Patent Office 3,208,369
Patented Sept. 28, 1965

3,208,369
BREWING MECHANISM
John A. Greenly and Arnold I. Ristimaki, both of 5115 Hanson Court, Minneapolis, Minn.
Filed Mar. 28, 1963, Ser. No. 268,733
5 Claims. (Cl. 99—283)

This invention relates to an improvement in a beverage preparing mechanism, and more particularly in the present embodiment the invention herein relates to a coffee brewing mechanism.

It is desirable to have and an object of this invention to provide a coffee brewing mechanism having the capacity to produce freshly brewed coffee within substantially the same interval of time that brewed coffee may be dispensed.

It is another object of this invention to provide a coffee brewing mechanism which requires in connection therewith only a small reservoir of brewed coffee.

It is a further object of this invention to provide a coffee brewing mechanism to be housed within a vending apparatus and be arranged and constructed to brew fresh coffee within the interval of time which is required to operate the vending apparatus and withdraw a cup of brewed coffee therefrom.

It is another object of this invention to provide a coffee brewing mechanism for quickly brewing coffee which may use any regularly ground coffee and which requires no special preparation of the coffee used.

It is more specifically an object of this invention to provide a relatively small compact coffee brewing mechanism of simple construction which may be readily mounted for operation within the housing of a vending machine to provide freshly brewed coffee ready for dispensing within the interval of time required to operate the vending machine and withdraw a cup of coffee therefrom.

These and other objects and advantages of the invention will be fully set forth in the following description made in connection with the accompanying drawings in which like reference characters refer to similar parts throughout the several views and in which:

FIG. 1 is a view in front elevation showing some portions in dotted line, some portions broken away and some portions schematically;

FIG. 2 is a view similar to FIG. 1 in end elevation, with portions thereof broken away and portions shown in dotted line;

FIG. 3 is a fragmentary view in vertical cross section on an enlarged scale taken on line 3—3 of FIG. 2 as indicated by the arrows;

FIG. 4 is a perspective view of a filter member of applicants' device;

FIG. 5 is a broken view in perspective of a portion of applicants' device;

FIG. 6 is a view in perspective showing the detail of another portion of applicants' device; and FIG. 7 is a schematic view showing the electrical circuitry in connection with applicants' device.

With reference to the drawings, applicants' apparatus is indicated generally by the character 10. Only as much related structure relative to the applicants' invention is shown as is deemed necessary for a full disclosure thereof. It will be understood that elements not shown but merely referred to or indicated schematically are elements known in the art and are here used in a known or customary manner.

In its commercial application, applicants' apparatus will be installed within a cabinet or housing comprising either a manual or coin operated dispensing or vending machine adapted to dispense a beverage such as coffee. A housing structure is not here shown and such a showing is not believed necessary relative to the disclosure of the invention herein.

With particular reference to FIGS. 1–3, a brewing chamber 12 is provided here shown to be substantially parallelepiped in form comprising front and rear walls 13 and 14, end walls 15 and 16, a bottom wall 17 and an open top 18. The end wall 15 has a height somewhat less than the height of the side walls 13 and 14 thus forming a transverse slot-like opening 19 between the upper end portions of said walls. The side walls 13 and 14 have semi-circular notches 13a and 14a centrally of their upper edge portions forming journals, as will hereinafter be described. Said chamber may be variously sized. In a preferred embodiment, a chamber sized to contain on the order of five cups of liquid has been found to be very satisfactory.

Mounted on the rear wall 14 of said brewing chamber is a suitable type of heating element 11 indicated generally and which will be suitably connected to a current supply.

Disposed in said brewing chamber 12 to be suspended therein is a filter member 20 semi-cylindrical in form having spaced side walls 21 and 22 and having an arcuate bottom wall 23 having a substantial portion thereof in the form of a fine mesh screen, such as on the order of an 80–100 mesh. At either upper end of said bottom wall is a reversely curved portion forming downwardly inclined lip portions 24 and 25 which will hook over the upper end portions of the end walls 15 and 16 of said brewing chamber. Said lip portion 24 is spaced somewhat below the upper edge portions of the side walls 21 and 22 to form an opening to coincide with the opening 19. Said side walls 21 and 22 will have semi-circular notches 21a and 22a at their upper edge portions to coincide with the journals 13a and 14a.

Arranged and constructed to be suspended within said filter member and supported therewith within said brewing chamber 12 is a member 30 forming a coffee feeding member which hereinafter is referred to as a coffee wheel. Said wheel comprises spaced circular side walls 32 and 33 respectively comprising a front and a rear wall and respectively having stub shafts 35 and 35a extending outwardly of either outer side thereof to ride in said journals 13a and 14a. Said shaft 35 is in the form of a free riding clutch to be engaged by a driving member to be hereinafter described.

Said coffee wheel further comprises a hub portion 34 formed between said side walls and extending outwardly thereof substantially tangentially thereto and spaced thereabout are vanes 36 forming open-ended pockets spaced circumferentially of said coffee wheel and designated by the characters 36a–36k and 36m. At the base of each of said pockets which are substantially V-shaped in cross section are apertures 32a extending transversely through the rear wall 32.

With reference to FIG. 3, an aperture 14b is formed in the wall 14 of said brewing chamber 12 and positioned to be in alignment therewith is a similar aperture 21b in wall 21 of said filter member 20. The apertures 32a of said coffee wheel 30 respectively will come into alignment with said apertures 14b and 21b with the rotation of said coffee wheel, as will hereinafter be explained. Said apertures 14b and 21b when alinged with any one of the apertures 32a form an inlet into the respective pockets of said coffee wheel.

As indicated in FIG. 3, the lower half of said coffee wheel 30 in operating position is disposed within the brewing chamber 12. A cover portion 40 is disposed over the upper half of said coffee wheel to enclose the same. Said cover portion is of the same transverse dimension as the upper edge portion of the filter member 20 to overlie the same. Said cover portion comprises an open bottom 41, side walls 42 and 43, end walls 44 and 45 and a top wall 46. Said side walls have semi-circular notches 42a and 43a in their lower edge portions to be in alignment with said notches or journals 21a and 22a respectively. Said wall 44 is shortened having a lower offset portion 44a forming a short right-angled shelf with depending side portions integral with said sides 42 and 43 to form an upward extension of said slot 19. The upper wall 46 has a central transverse slot 46a with an upwardly flared hopper 47 intergal with said upper wall and upstanding about said slot.

Said brewing chamber 12 will be conveniently supported as on a suitable shelf or bracket 50 within whatever enclosure it is installed.

Said coffee wheel 30 fits sufficiently snug within said cover portion 40 and said filter member 20 whereby said apertures 32a are effectively sealed except when in alignment with said apertures 14b and 21b to form a passage therewith.

Suitably secured to said brewing chamber 12 is a depending discharge trough member 52 substantially rectangular in cross section having an upper inlet portion 53 overlying said extended slot 19 and receiving therein said offset portion 44a. Said trough member extends downwardly running to a suitable drain which is here shown as a bucket 54.

Suitably supported above said cover portion 40 is a roll of filter paper 57 having a web or tape portion 57a thereof threaded through said hopper 47 and partially about said coffee wheel 30 through the inner side of said filter member 20 to be supported thereby, out through the slot 19 and down through said discharge trough 52.

Extending transversely through the lower portion of said trough 52 is a shaft 59 driven by a motor 60 which will be suitably supported as indicated on a shelf or bracket 62. Said shaft will have mounted thereon within said trough a resilient roller 63 of relatively small diameter. A second roller 65 of larger diameter will be suitably mounted on a shaft 66 and extend through a slot in said trough 52 to form an idle pressure roller with said filter web 57a being engaged between said rollers 63 and 65. The electrical system which will include said motor will hereinafter be described.

Depending from said chamber 12 is a drain cock 70 having a suitable valve 71 therein in connection with an outlet pipe 73 which will run to a suitable drain, such as the bucket 54.

In connection with said coffee wheel 30 there will be suitably mounted as on a bracket 77, a motor 78 having a drive shaft 79 adapted to engage the stub shaft 35 to drive the same as in a clockwise direction.

A suitable hot water supply indicated by the block diagram 80 will be provided which will be gravity fed through a conduit 81 which will run to an inlet 83 secured to the side wall 14 in alignment with said apertures 14b and 21b. A solenoid valve 82 is carried by said conduit 81 to control the passage of water therethrough. Said water supply will have a temperature on the order of 200°–208° F. for brewing coffee.

Suitably mounted relative to the hopper 47 is a coffee supply chamber 85 of suitable construction and indicated here schematically. A discharge chute 87 will run from the coffee supply chamber to feed into the hopper 47 and in connection with said supply chamber and discharge chute is a metering device 86 in the form of a screw or auger driven through suitable linkage by a motor 89.

A conduit 90 is disposed through an upper portion of the trough member 52 to have one end extend into the slot opening 19 and running therefrom to a suitable pressurized water supply 93 here indicated schematically and carried by said conduit is a solenoid valve member 94 to control the passage of water therethrough.

Mounted on the front wall 13 is a coffee dispensing mechanism 100 comprising a conduit 101 which will be suitably secured to said front wall for communication with the chamber 12 and running through a metering valve 103 indicated here as being manually adjustable and having a discharge or dispensing conduit 104 running therefrom. In association with the conduit 101 to control the passage of brewed coffee therethrough is a solenoid valve 105 which will be actuated, as will hereinafter be described. The coffee will be dispensed into a cup through the conduit 104 and for purposes herein said cup may be held in hand by the operator or may be mechanically fed in a customary manner.

With reference to the coffee brew chamber 12, the liquid level therein is indicated by the dotted line 107. A preferably size for said chamber as previously indicated is such that it will contain on the order of five cups of coffee. The brewed coffee outlet or discarge outlet 101 is spaced sufficiently above the bottom of said chamber 12 not to dispense what would be the bottom cup of coffee in said chamber. It is inevitable that some coffee fines and sediment will collect at the bottom of the chamber and this material will be drained off periodically through the drain cock 70.

An electrode control and relay member 110 is provided having an electrode 111 depending within said chamber 12 down to the upper point of liquid level, as indicated by the dotted line 107 in FIG. 3. At this point the liquid in contacting said electrode within said chamber grounds said electrode 111 to the walls of said chamber 12 which results in valve 82 being in a closed condition. A manual switch 112 is included within the member 110 to ground said electrode in the absence of any liquid within said chamber.

Referring to FIG. 7, a wiring diagram is shown of the electrical circuitry in connection with the applicants' apparatus.

A timer motor 120 is provided to be initially energized by a coin operated or a manual momentary contact or impulse switch 121. Directly connected to said motor by a common shaft 124 are switch operating cams 125–129 respectively having in connection therewith single contact switches 130–133 and a double contact switch 134. Said motor 120 will be designed to rotate shaft 124 on the order 9 RPM or a fraction over 6 seconds for each rotation which represents one complete cycle of operation.

Said cam 125, which is a timing cam, closes the switch 130 for an interval of time to energize said motor 120 for one complete cycle of operation. As the cycle of operation begins, the cam 126 closes the switch 131 to energize the motor 89 to actuate the auger 86 and meter ground coffee into the hopper 47.

The cam 129 closes the switch 134 to energize the solenoid 105 for dispensing brewed coffee. Said switch 134 is normally in an open circuit in connection with the solenoid 82.

The index cam 127 closes the switch 132 to energize the motor 78, which motor by means of drive shaft 79 drives the coffee wheel 30. Carried on said shaft 79 is a twelve position indexing cam 142 with one position respectively for each pocket of said coffee wheel 30.

Said cam 142 operates a double contact switch 145 which normally is in closed position relative to the switch 132. As said cam is moved, the circuit with switch 132 is broken and a second circuit 146 is opened for the interval of time that the cam 142 moves one complete position.

In circuit with the motor 78 is the motor 63 which advances the filter web 57a as said coffee wheel 30 is advanced.

Timed to the movement of the coffee wheel 30 is the cam 128 which closes the switch 133 to energize the solenoid valve 94 which in turn permits the passage of water under pressure from the water supply 93 to flush out a pocket of said coffee wheel 30, as will be described.

At the completion of a cycle of operation, the switch 134 will return to its normal position, the liquid level in the brewing chamber will have dropped breaking contact with the electrode 111 deenergizing the relay 111a to permit the switch 143 to assume its normally closed position to energize and open the solenoid valve 82 to allow the passage of hot water through the inlet 83 into a pocket of said coffee wheel 30. It will be noted that valve 82 does not open until the switch 134 resumes its normal position to be in a closed position relative to said valve.

In connection with the heating element 11 is a thermostatic control member 145. Said thermostat will be designed to maintain a liquid temperature in said coffee chamber on the order of 165°–175° F.

The electrical elements above described will be connected by suitable wiring and the circuitry above described by means of lines L1 and L2 will be connected to a suitable power supply.

*Operation*

The applicants provide a small batch quick brewing coffee apparatus designed to use regular ground coffee. The present embodiment of the applicants' apparatus is indicated as having a reservoir capacity of five cups whereby with coffee being drawn off with any degree of frequency, the brewed coffee will be relatively fresh at all times. If at the end of any period of use, such as at the end of a work week, it is desired to drain the brew chamber 12, only a relatively small quantity of coffee at most will be drained off as waste. The relatively small capacity of the brew chamber is made feasible by the fresh brewed coffee on a continuous basis within the interval of time that fresh coffee may be drawn off by users.

The applicants' apparatus will be suitably mounted within the housing as of a vending machine with the coin mechanism of the vending machine in a known manner being adapted to actuate the switch 121.

For convenience of description, fixed positions as stations A–K and M are indicated about the coffee wheel 30, which positions or stations will be assumed respectively by the pockets 36a–36h and 36m during the course of rotation of said coffee wheel 30.

A momentary closing of the switch 121 will energize the motor 120 to commence the rotation of shaft 124. The cam 125 will immediately close the switch 130 to energize the motor 120 throughout one complete rotation of the shaft 124 which represents a cycle of operation.

Immediately with the rotation of shaft 124, the cam 129 actuates the switch 134 throughout a complete cycle of operation to energize and open the solenoid valve 105 for the passage of brewed coffee from the chamber 12 through the conduit 104 into an available cup either mechanically fed into position by suitable apparatus or held by hand. When the switch 134 is positioned to open the valve 105 it interrupts the circuit which would otherwise open the valve 82.

The outlet conduit 101 is positioned sufficiently above the bottom of the chamber 12 not to drain off the bottom cup of brewed coffee therein. The valve 103 provides a manual control over the quantity of coffee passing through the conduit 104 to predetermine the time for filling a cup with coffee within the time of a cycle of operation.

Also at the beginning of a cycle of operation, the cam 126 will close the switch 131 to energize the motor 89 to rotate the auger to meter out and deposit in the pocket of the coffee wheel in position A a predetermined amount of ground coffee. For purpose of description at this point it will be assumed that the applicants' apparatus has been in operation and that the pockets in the positions B through F have already received deposits of ground coffee. The ground coffee in the pockets in the positions D through F is immersed in water. Thus as from position D to position G, as indicated in FIG. 3, ground coffee is pre-wetted through substantially three cycles of operation before being moved to the position where brewing takes place. The average temperature in the chamber 12 will be on the order of 165°–175° F. Thus the ground coffee being pre-wetted is gradually swelled and prepared for the brewing stage at position G.

When ground coffee has been metered into the pocket in position A, the motor 78 will be de-energized and the cam 127 will have moved to the position of closing the switch 132 into an open circuit with the switch 145 to energize the index motor 78 and the filter top motor 63. The index motor 78 through the shaft 79 rotates the index cam 142 to rotate the coffee wheel 30 to the extent of advancing the pockets thereof one position. It will be noted that as the index cam 142 advances the extent of one position that said cam 142 will break the circuit between the switches 145 and 132 and position the switch 145 to energize the circuit 146 to continue the operation 134 to resume its closed position relative to the valve 82, thus energizing and opening said valve to permit the passage of hot water into the pocket of the coffee wheel at position G. The water will be gravity fed for uniformity of flow and to permit a slower and more complete brewing process than would be possible with the water under any greater degree of pressure. The hot water passed by the solenoid valve 82 will flow into the chamber 12 until the liquid level of said chamber again rises to a point of contact with the electrode 111 at which point the relay 111a will be energized opening the switch 143 and closing the valve 82.

It has been found that with ground coffee having been pre-wetted, that the period of time taken for the fresh supply of hot water to pass through the ground coffee at the position G is sufficient for the extraction of the most desirable coffee flavor and that there results a fine cup of brewed coffee.

If coffee is drawn off rapidly, it will be seen that the temperature of the dispensed coffee will approach the temperature of the incoming water, which temperature is on the order of 200°–208° F. Where brewed coffee is drawn off infrequently, there will be an average temperature maintained in the brewing chamber between 165°–175° F. in accordance with the setting of the thermostat 145 relative to the heating element 11. At this lower temperature, brewed coffee is at a desirable drinking temperature, but this temperature is not high enough to extract any additional oils from the coffee grounds present in the pocket of the coffee wheel at stations G, H and I. Thus there is no tendency for the brewed coffee to develop a strong, harsh or undesirable flavor.

The final cam to function to complete the cycle of operation is the flush cam 128. Said cam closes the switch 133 to energize and open the flush solenoid valve 94 which permits water under suitable pressure to enter into the coffee wheel pocket in position J to flush out the coffee grounds therefrom and wash the same down the drain trough 52.

In the event that liquid may evaporate from the brew chamber 12, the lowering of the liquid level below a point of contact with the electrode 111 will through the circuitry above described open the valve 82 to admit water through the inlet 32a at the station G. Thus water will enter in very small increments and will not be sufficient to extract further oils from the coffee grounds present in the pocket at this position to adversely affect the flavor of the brewed coffee in chamber 12. Thus coffee flavor will not suffer from evaporation of liquid in the brew chamber.

Whenever it is desired to drain out the brew chamber, this may be done by opening normally the drain cock valve 71.

The operation herein was commenced with the assumption that applicants' apparatus had been in operation for some time. When initially commencing operation, there will be no liquid in the brew chamber nor ground coffee in any of the pockets. The manual valve 103 will be closed to prevent any liquid from being dispensed from the chamber 12. The switch 112 will be positioned to ground the electrode 111 directly to the adjacent side of the chamber 12, said switch substituting for the liquid contact with said electrode when the brew chamber is filled. The apparatus is then put through seven cycles of operation during which time coffee will be metered into pockets of the coffee wheel, which pockets will occupy positions A–G. With the seventh cycle of operation, the switch 112 will be opened to interrupt its circuit with the electrode 111 whereby the solenoid valve 82 will be opened to the extent of admitting a cup of hot water to brew the coffee at position G. The valve 82 will be thus manually controlled until five cups of coffee have been produced to fill the chamber 12 to its liquid level point. Admittedly the first five cups of coffee produced will not be at full strength due to the absence of the pre-wetting of the ground coffee, but thereafter the coffee brewed will be at a desirable taste level. The valve 103 will be opened a suitable extent as soon as the chamber 12 has been filled to its liquid level point.

The timer motor preferably will be designed to operate at a speed to rotate the shaft 124 each revolution through an interval of approximately six seconds. A complete cycle of operation is just a slightly longer period of time in that the brewing water enters into the brew chamber 12 after the completion of the rotation of the shaft 124. A cup of brewing water will pass into the pocket at position G and into the chamber 12 before the next cycle of operation may be commenced by a coin being dropped into the coin slot of the vending machine housing applicants' apparatus. Some of the brewing water will continue to pass through the ground coffee in the pocket at position G after said pocket has advanced to position H with continuous operation of the apparatus. It is seen that prior to the brewing stage, the ground coffee has been pre-wetted through substantially three cycles of operation at positions D–F and for a small portion of a cycle at position G to the point where brewed coffee is drawn off at the beginning stage of a cycle.

Thus it is seen that we have provided an efficient, simply constructed apparatus for quickly brewing small batches of coffee and for extracting only the most desirable taste, flavors or oils from commonly ground coffee. Applicants' apparatus has proved to be entirely successful in practice.

It will of course be understood that various changes may be made in the form, details, arrangement and proportions of the apparatus and in the steps and sequence of steps of the method without departing from the scope of applicants' invention, which, generally stated, consists in a method and apparatus capable of carrying out the objects above set forth, such as disclosed and defined in the appended claims.

What is claimed is:
1. A coffee brewing mechanism having in combination,
a coffee feeding member comprising a succession of pockets to receive ground coffee,
means supplying ground coffee to said pockets of said coffee feeding member,
a brewing chamber having a water inlet and accommodating said pockets,
said coffee feeding member being arranged to have one of said pockets in register with said ground coffee supplying means and another of said pockets in register with said water inlet,
a heating element in connection with said brewing chamber,
brewed coffee dispensing means in connection with said brewing chamber,
a brewing water supply in communication with said inlet of said brewing chamber,
means controlling passage of said brewing water to said brewing chamber,
means in connection with said brewing chamber to maintain a certain liquid level therein, said last mentioned means being actuated by a lowering of liquid in said brewing chamber below said level,
means simultaneously actuating said ground coffee supplying means and said brewed coffee dispensing means,
said last mentioned means advancing said coffee feeding member when said brewed coffee has been dispensed to register simultaneously a certain of said pockets thereof with said coffee supply means and a certain other of said pockets thereof with said water inlet of said brewing chamber, and
means relative to said brewed coffee dispensing means providing for passage of said brewing water to said inlet of said brewing chamber when said brewed coffee has been dispensed.

2. The structure set forth in claim 1,
a discharge outlet for coffee grounds in said brewing chamber,
said fourth mentioned means respectively advancing said pockets of said coffee feeding means into register with said discharge outlet,
a drain trough in connection with said discharge outlet,
a water supply in connection with said discharge outlet, and
means providing for passage of water from said last mentioned water supply to flush out said pockets respectively in register with said discharge outlet.

3. The structure set forth in claim 1,
a coffee filter comprising a web,
said web disposed about said pockets in said brewing chamber, and
means advancing said web simultaneously with the advance of said coffee feeding member.

4. A coffee brewing mechanism having in combination,
a coffee feeding wheel substantially cylindrical in form having open-ended pockets spaced thereabout, said pockets respectively having water inlets,
means supplying ground coffee into the pockets of said coffee feeding wheel, said coffee feeding wheel being constructed and arranged to have its pockets respectively placed in register with said means,
a brewing chamber having said coffee wheel journaled therein to be partially disposed therein and having a water inlet,
a filter about the pockets of said coffee wheel disposed in said brewing chamber,
means in connection with said brewing chamber dispensing brewed coffee,
a brewing water supply means for passage of brewing water from said brewing water supply to said brewing chamber,
means in connection with said brewing water supply maintaining a certain liquid level within said brewing chamber, said last mentioned means actuated by a lowering of the liquid level in said brewing chamber below said certain level,
means simultaneously actuating said ground coffee supplying means and said brewed coffee dispensing means,
means advancing said coffee wheel to successively position the pockets thereof into register with said inlet of said brewing chamber and said ground coffee supplying means, and
means actuating said means for passage of said brewing water into said inlet of said brewing chamber and into the pocket in register therewith when said brewed coffee has been dispensed.

5. A coffee brewing mechanism having in combination,
a coffee feeding wheel substantially cylindrical in form having open-ended pockets spaced thereabout,
means in operative association with said coffee feeding wheel for supplying ground coffee to said pockets thereof, said coffee feeding wheel being constructed and arranged to have its pockets respectively placed in register with said means,
a brewing chamber having a water inlet,
said coffee feeding wheel being journaled in said brewing chamber and being partially disposed therein and arranged to have the pockets thereof advance through said brewing chamber, one of said pockets of said coffee feeding wheel being in register with said ground coffee supply means and another of said pockets being in register with said water inlet of said brewing chamber, means maintaining a certain liquid level within said brewing chamber to have said pocket advancing through said brewing chamber under immersion therein, means dispensing brewed coffee from said brewing chamber and actuating said coffee supplying means to supply ground coffee to the pockets in register therewith, means advancing said coffee feeding wheel to successively register said respective pockets with said ground coffee supplying means and said water inlet in said brewing chamber, said means maintaining said liquid level in said brewing chamber actuated by said dispensing means when said brewed coffee has been dispensed to provide brewing water to said water inlet in said brewing chamber to brew ground coffee within the pocket in register therewith.

References Cited by the Examiner

UNITED STATES PATENTS

| | | | |
|---|---|---|---|
| 1,478,908 | 12/23 | Oldham | 99—71 |
| 1,674,857 | 6/28 | Emerson | 99—71 |
| 1,850,082 | 3/32 | Medin | 99—289 X |
| 2,622,504 | 12/52 | Crote | 99—289 |
| 2,718,843 | 9/55 | Jones | 99—289 |
| 2,827,845 | 3/58 | Richeson | 99—286 X |
| 2,910,928 | 11/59 | Rota | 99—286 X |

FOREIGN PATENTS

| | | |
|---|---|---|
| 1,238,694 | 7/60 | France. |
| 265,043 | 10/13 | Germany. |

ROBERT E. PULFREY, *Primary Examiner.*

A. LOUIS MONACELL, JEROME SCHNALL,
*Examiners.*